UNITED STATES PATENT OFFICE.

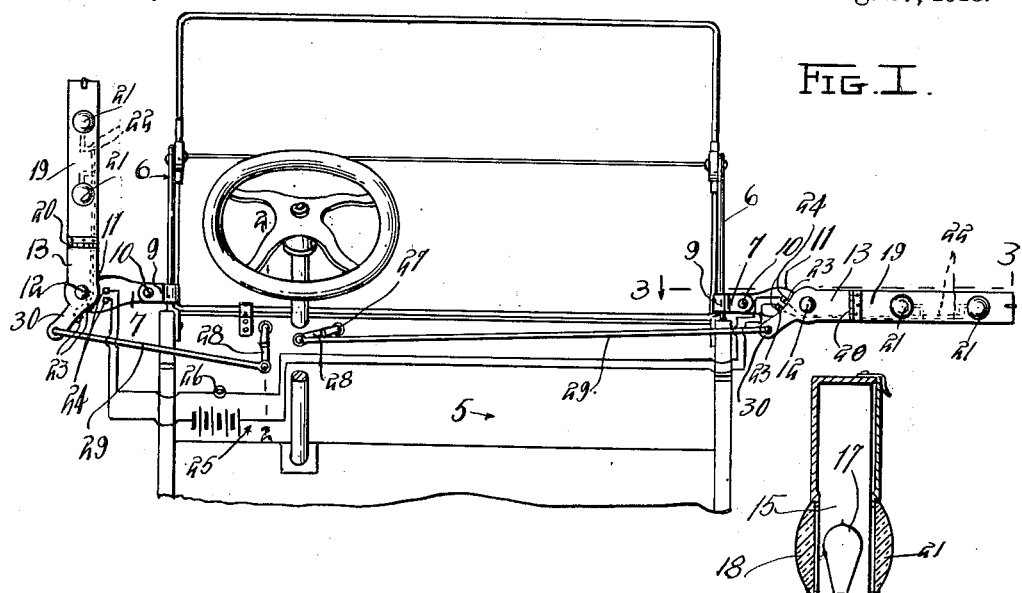

CLARK R. HAYHURST, OF TEXAS CITY, TEXAS.

DIRECTION-SIGNAL.

1,276,908.

Specification of Letters Patent.

Patented Aug. 27, 1918.

Application filed February 21, 1916. Serial No. 79,746.

*To all whom it may concern:*

Be it known that I, CLARK R. HAYHURST, a citizen of the United States, residing at Texas City, in the county of Galveston, State of Texas, have invented certain new and useful Improvements in Direction-Signals; and I do hereby declare the following to be a full, clear, and exact description of the invention, such as will enable others skilled in the art to which it appertains to make and use the same.

This invention relates to direction indicators, and is adapted particularly for use in connection with vehicles.

The primary object of the invention is to provide a simple and efficient means applicable to a vehicle, which may be actuated by the driver or occupant thereof to indicate to others in advance or in the rear of the vehicle the direction to be taken by the latter.

A further object of the invention is to provide a device of the character described which is capable of being readily attached to or detached from vehicles of various types.

A still further object of the invention is to provide a direction indicating device equipped with illuminating means, whereby the same may be effectually used after dark.

With these objects in view, together with others which will appear as the description proceeds, the invention resides in the novel combination and arrangement of parts, all as will be described more fully hereinafter, illustrated in the drawings, and particularly pointed out in the claims.

The invention will be best understood by reference to the accompanying drawings, wherein:

Figure 1, is an elevation of the dash board and windshield of a motor vehicle as viewed from the inside thereof, and indicating the application of a signaling mechanism constructed in accordance with my invention, Fig. 2, is a sectional view taken on line 2—2 of Fig. 1, Fig. 3, is an enlarged plan view taken on line 3—3 of Fig. 1, and Fig. 4, is a sectional view taken through one of the signaling arms.

Referring now more particularly to the drawings, 5 indicates generally the dash of a vehicle, from the lateral ends of which extend the upwardly projecting windshield posts 6. Secured to each of the posts 6 to project laterally beyond the lines of the vehicle is a bracket 7, the same being constructed as at 8 to partially encircle the posts 6, and a clamp member 9 is secured to the innermost end of the bracket by means of bolts 10 to coöperate with the portion 8 in securing the bracket rigidly to the said posts. By this construction it is obvious that upon removal of the bolts 10 the brackets may be readily detached from the vehicle. The outer extremity of each bracket is rounded and cut away as at 11 to provide a shoulder, and the rounded end of the bracket is provided with a substantially centrally disposed opening through which a pivot bolt 12 upon a signal arm 13 extends. The signal arm is cut away slightly adjacent its connection with the bracket to provide a stop or shoulder 14, for coöperation with the depression 11 upon the bracket for limiting the rotary movement of the arm in one direction. The signal arm 13 may be of any desired shape or size, and is preferably cut away to provide a pair of spaced transversely disposed openings 15. Sockets 16 are arranged on the arm to communicate with the openings 15 therein, whereby lamp bulbs 17 may be seated therein to project within the openings 15. Suitably colored glasses 18 may be arranged to close one end of each of the openings 15, and a door 19 is hingedly connected as at 20 to the opposite face of the arm to normally close the opposite ends of said openings, glasses 21 being arranged in the said door to aline with the said openings. This construction obviously permits of access being had to the interior of the signaling arms, whereby the lamps mounted therein may be repaired or replaced when necessary. When the door 19 is in closed position, and the lamps are illuminated, it is apparent that the light therefrom may be observed from the glasses 18 and 21 upon each side of the arms. Current conducting wires 22 may be arranged within each of the arms to include the lamp sockets 16, the said wires extending toward the pivotal connection of the arm with the bracket and are connected respectively to spaced contacts 23 upon the outer edge of the said arm. The bracket 7 is also equipped with spaced contacts 24, to which are connected the ends of conductors leading from a suitable source of electrical energy 25 upon the vehicle, and a switch 26 may be arranged in one of the said conductors to make or break a circuit. The arrangement of the contacts upon the pivotal arm 13 and the bracket 7 is such that the same will only engage when the arm has been swung to outwardly extending position, and when in such position the circuit from the source 25 through the contacts and lamps is completed, whereupon the said lamps will be ignited. When the arm 13 is rocked to vertical position the circuit will be broken and the lamps extinguished as is obvious.

As an efficient means for readily operating the arms 13 from a position convenient to the vehicle operator, shafts 27 are provided. These shafts are mounted for rotation upon the dash of the vehicle and project rearwardly therefrom preferably adjacent the steering post of the vehicle. Each shaft is equipped with a downwardly projecting arm 28, to the end of which is pivotally connected one end of a link 29, the said link being connected at its opposite end to an arm 30 projecting from the signal arm 13. Upon oscillation of the shaft 27 it will be readily seen that the link 29 will operate to rock the signal arm upon its pivot accordingly as the shaft 27 is oscillated. When the arm 13 is moved to extended position the lamps 17 therein will be ignited to apprise persons in advance or in the rear of the vehicle that the driver of the latter intends turning in the direction indicated by the arm. The arm upon the opposite side of the vehicle may be actuated to signify turning in the opposite direction. If desired, both arms may be actuated to extend outwardly to indicate when the vehicle driver intends to stop. It is understood that the lamps within the arms may only be ignited when the vehicle is operating after dark, the current to be delivered to the said lamps being controlled through the switch 26.

It is obvious that a signaling device constructed in accordance with the above description is capable of being applied to various types of vehicles. Current necessary for igniting the lamp may be obtained from the usual lighting system upon the vehicle. It is also obvious that various minor changes in the details of construction and arrangement of parts may be resorted to without departing from the spirit of the invention and I reserve to myself the right to make such changes as may be deemed necessary without exceeding the scope of the claims.

I claim:

1. A direction indicator comprising a support adapted for securement to one side of a vehicle, a signal member pivotally mounted on said support, an operating shaft, means for pivotally securing said operating shaft to a dashboard to extend inwardly therefrom, a crank arm on said shaft, a link connecting the crank arm and the signal member, and a lateral operating arm on the inner end of the shaft.

2. A direction indicator comprising the combination with an automobile, of a journaled shaft supported by the dashboard thereof and extending inwardly at one side of the steering wheel, a depending arm on said shaft engageable by the knee of an operator, a signal member movably carried by the automobile and means operable by rotation of the shaft for moving said signal member.

In testimony whereof, I affix my signature, in the presence of two witnesses.

CLARK R. HAYHURST.

Witnesses:
GEORGE A. ROSS,
M. J. TERRY, JR.